United States Patent [19]

Kamp

[11] 4,428,788
[45] Jan. 31, 1984

[54] FILM-TAPE-CLOSURE DEVICE SLOT CAST INTEGRATED INTERLOCKING STRUCTURE AND EXTRUSION METHOD

[75] Inventor: Ewald A. Kamp, Chicago, Ill.

[73] Assignee: Union Carbide Corporation, Danbury, Conn.

[21] Appl. No.: 378,321

[22] Filed: May 14, 1982

[51] Int. Cl.³ .......................... B29D 7/02; B32B 1/04; B32B 1/10

[52] U.S. Cl. ........................................ 156/66; 383/63; 156/244.11; 156/244.25; 156/500; 156/501; 264/177 R; 264/259; 425/111; 425/112; 425/113; 428/172; 428/192

[58] Field of Search ........................ 24/201 C; 150/3; 156/66, 244.11, 244.25, 500, 501; 229/48 T, 62; 264/177 R, 259; 425/111, 112, 113; 428/172, 192

[56] References Cited

U.S. PATENT DOCUMENTS

| | | | |
|---|---|---|---|
| Re. 29,208 | 5/1977 | Naito | 156/91 |
| 3,226,787 | 1/1966 | Ausnit | 150/3 X |
| 3,338,284 | 8/1967 | Ausnit | 150/3 |
| 3,462,332 | 8/1969 | Goto | 156/244 |
| 3,846,209 | 11/1974 | Howard | 156/502 |
| 3,848,035 | 11/1974 | Behr | 264/40 |
| 3,852,386 | 12/1974 | Behr | 264/40 |
| 3,904,468 | 9/1975 | Noguchi | 156/244 |
| 3,945,872 | 3/1976 | Noguchi | 156/244.25 X |
| 4,101,355 | 7/1978 | Ausnit | 156/66 |
| 4,279,677 | 7/1981 | Takahashi | 150/3 X |
| 4,295,919 | 10/1981 | Sutrina et al. | 156/244.25 X |
| 4,306,924 | 12/1981 | Kamp | 156/66 |
| 4,341,575 | 7/1982 | Herz | 156/66 |
| 4,362,198 | 12/1982 | Kamp | 150/3 |

Primary Examiner—Robert A. Dawson
Attorney, Agent, or Firm—Real J. Grandmaison; John C. LeFever

[57] ABSTRACT

A method and apparatus for extruding a film, a tape and a closure device simultaneously to produce integrated interlocking closure stock comprising (a) extruding a sheet of film onto a rotating casting roll at a rate to provide a high draw-down ratio; (b) extruding a tape to join the film on the casting roll at a rate to provide a medium draw-down ratio; and (c) extruding a closure device onto the tape as it approaches the casting roll at a rate to provide a small draw-down ratio.

15 Claims, 4 Drawing Figures

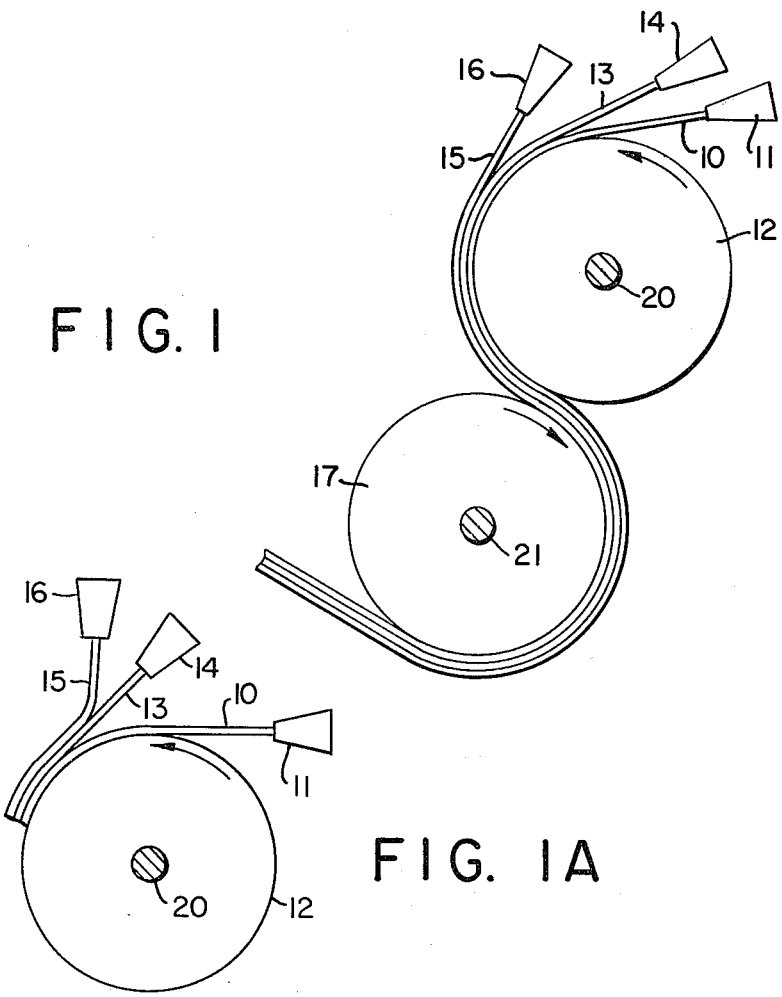
FIG. 1
FIG. 1A
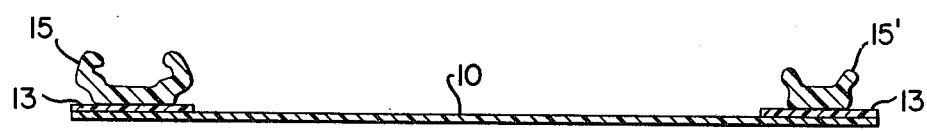
FIG. 3

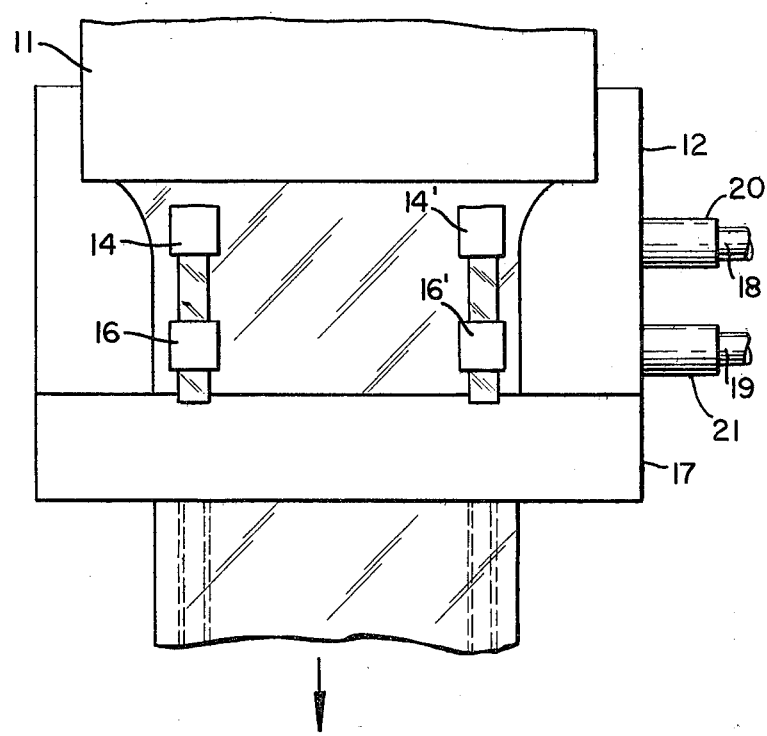

FILM-TAPE-CLOSURE DEVICE SLOT CAST INTEGRATED INTERLOCKING STRUCTURE AND EXTRUSION METHOD

This invention relates to disposable and re-usable plastic containers such as sandwich and food storage bags, and more particularly, to a method of and apparatus for, co-extruding the components of such containers.

Plastic bags, pouches and containers of various types having interlocking pressure-sealable closures are well-known, commercially available items which are currently used for a variety of purposes. The demand for these bags is continuously growing as new uses for them are found, but also growing is the demand for a higher quality product that will reliably protect the contents of the package. Accordingly, great pressure has been placed on manufacturers of such bags to produce them in ever greater quantities while reducing the number of defects that occur in the manufacturing process, so that they are not only more reliable, but more economical to produce. Such containers may be formed in a variety of ways, with each method having its advantages and disadvantages. For example, a suitable container may be formed from tubular plastic material by heat sealing one end to close it and securing a suitable closure to the remaining end. Such closures may be, for example, conventional pressure-sealable fasteners, slide fasteners, or the like, formed from two corresponding interlocking halves. Each half of the fastener is provided with a flange by means of which it may be secured to a corresponding edge of the container opening as by means of a suitable heat sealing process.

A method of making containers may be provided wherein a length of the fastener strip which comprises the two halves of the interlocking fastener is located between the edges of a folded web of sheet material. The assembly is intermittently fed to a sealing station where a heating bar moves into contact with adjacent sections of the strip and web edges to weld them together. Thereafter, the resulting stock material is cut into desired lengths and cut edges are welded closed to form the desired containers.

Such methods produce containers with openable and reclosable interlocking fastener closures that are suitable for many purposes, and containers made in this manner have proved to be commercially successful. However, as the demand for containers increases, and as the containers are put to more sophisticated uses where reliable closures are required which will, for example, permit the contents of a bag to be sealed off from the ambient air, the failings of the prior art methods become evident. Such a process requires an intermittent motion of the plastic film and fastener strip, thus materially slowing down the welding operation. The material must be advanced into the sealing station and stopped, the heat sealing bar must move down, pause in contact with the edges to be welded while heat is applied and the plastic is allowed to cool. Thereafter, the bar is raised and the web and fastener strip are again advanced. This intermittent action severely limits the speed at which the stock material can be manufactured and thus limits the number of bags that a given machine can produce per unit of time.

An alternative mode of operation where the heat-sealing equipment is mounted in a fixed position above a continuously moving web and fastener strips, has been suggested. However, such an arrangement requires the use of more complex mechanical structures which would increase the cost of the machines and would decrease their reliability. It has also been found that in feeding sheet material and fastener strips into a heat-sealing machine it is very difficult to maintain constant tension and alignment of the fastener and the sheet. As a consequence, bags manufactured in this manner often are formed with a slight bow along the fastener edge, making the containers unsightly and wider containers often commercially unacceptable, as well as causing other defects.

An additional problem in the prior art arises from the fact that heat-sealing of a closure flange and container film requires a certain amount of overlap, that is, the dimensions of the flange and film must be wider than the actual heat-sealed interface. It has been found that this generates a pocket in the container which is difficult to clean and may, for sanitary reasons, limit the reuse of the container for food storage purposes. In various attempts to overcome some of the aforementioned problems, it has been proposed to provide a blown film die equipped with apertures to generate the closure elements on the surface of the film. Another method provides freshly extruding a closure strip onto a heated film and pressing the closure strip into the film by nip rolls. A further method provides extruding a slot cast film onto a chill roll and extruding a closure element on top of the still hot film thereby producing a hot juncture. Still another method describes fusing separately extruded closure strips on top of a preformed moving film.

However, it has been found that joining multiple stock components will result in frequent stock changes thus reducing manufacturing efficiency. In addition, integral extrusion of a blown film and closure elements is truly difficult to control and is not suitable for the manufacture of most types of closure elements such as for example, finger pressure closing devices requiring precision closures. That is, precision made irregular profile extrusions will perform more satisfactorily if drawn-down ratios are quite limited. It has further been found that the juncture of the closure elements to extrudates is better if air entrapment is avoided during such processes. Therefore, an improved process and apparatus is needed to overcome the above-noted drawbacks.

In accordance with this invention there is provided, generally speaking, a method for producing integral interlocking closure products wherein the pouch film, closure tapes or flanges, and closure elements are extruded from separate dies, brought together at preferred and controlled drawn-down ratios, and permitted to cool on a supporting rotating cylinder. More specifically, the method comprises producing a film, closure flange, and closure element structure comprising extruding a sheet of film onto a rotating casting roll at a rate to provide a high draw-down ratio, extruding a closure tape or flange to join the film on the casting roll at a rate to provide a medium draw-down ratio, extruding a closure device element onto the tape or flange as the tape or flange approaches the casting roll at a rate to provide a small draw-down ratio, and extracting the integrated structure after cooling it on the casting roll.

In another embodiment of this invention there is provided, generally speaking, an apparatus for producing an integrated film, closure tape or flange, and closure device element structure comprising means for extruding a sheet of film onto a rotating casting roll at a rate to provide a high draw-down ratio, means for extruding a closure tape or flange to join the film on the casting roll at a rate to provide a medium draw-down ratio, means for extruding a closure element onto the tape or flange as the tape or flange approaches the casting roll at a rate to provide a small draw-down ratio, and means for extracting the integrated structure after cooling it on the casting roll.

This invention enables the provision of the three main elements of a container having an interlocking closure device to be prepared in a controlled manner and cooled under advantageous conditions while maintaining physical and dimensional accuracy. As indicated, the main elements of a container consist of a container film which is usually thin and forms a pouch, a tape or flange material used for a finger grip during handling of the container, and a closure device to enable opening and closing the pouch and which is usually attached to the tape or flange material. The closure device generally comprises a male profile portion comprising a base portion having a pair of parallelly disposed webs integrally attached to the base portion and extending therefrom wherein the webs terminate in hooks which extend away from each other. The closure device generally will also include a female profile portion comprising a base portion having a pair of parallelly disposed webs integrally attached to the base portion and spaced to straddle the webs on the male profile portion wherein the webs on the female profile portion terminate in hooks which extend toward each other to engage the hooks on the male profile portion. However, the closure device may have any suitable profile configuration such as an arrowhead male profile or others as well known in the art. In accordance with the present invention, the aforementioned elements can be simultaneously extruded in the same general vicinity of each other and are brought together at different times on a casting roll where they are joined while still warm and in a "tacky" or cohesive condition. It has been found that handling the aforementioned three main elements separately permits an optimization heretofore unattainable.

For a fuller understanding of the nature and objects of the invention, reference should be made to the following detailed description taken in conjunction with the accompanying drawings, in which:

FIG. 1 is a side view of the principal operating means of the invention;

FIG. 1A is a side view of an alternative operating means of the invention;

FIG. 2 is a plan view depicting the relative position of the main apparatus means of the invention; and FIG. 3 is a cross-sectional end view of the integral structure provided by this invention.

In carrying out the best mode of the invention, several embodiments have been selected for illustration in the accompanying drawings and for specific description, reference being had to the figures herein.

In FIG. 1, a sheet of thermoplastic film 10 is extruded from a slot die 11 having an elongated opening parallel to the axis of a rotatable casting cylinder or roll 12 supported by shaft 20. Slot die 11 is supplied by a melt feed conduit (not shown). The film 10 of thermoplastic material is extruded from slot die 11 onto casting cylinder 12. The opening or gap of slot die 11 is typically between about 30 mils and about 40 mils. Thermoplastic film 10 is extruded onto casting cylinder 12 at a rate to provide a high draw-down ratio, i.e., to provide a thermoplastic film having a thickness of between about 0.5 mil and about 3 mils. The draw-down ratio is the ratio of die gap to final film thickness. Thus, the draw-down ratio of film 10 from die 11 is in the range of from about 10:1 to 80:1.

Upon initiation of the formation of thermoplastic film 10, a closure tape or flange 13 is extruded from tape or flange die 14 to join with thermoplastic film 10 at or near casting cylinder 12. The closure tape or flange is extruded onto film 10 at a rate to provide a medium draw-down ratio, i.e., to provide a closure tape or flange having a thickness of between about 2 mils and about 5 mils at an extrusion draw-down ratio of between about 4:1 to about 10:1. The closure tape or flange is typically narrow, i.e., on the order of about 1 inch wide.

Immediately pursuant to the formation of the closure tape or flange onto thermoplastic film 10, a closure device 15 is extruded from closure die 16 to join the closure tape or flange 13 previously joined to film 10. The closure device is extruded onto the closure tape or flange at a rate to provide a small draw-down ratio, i.e., to provide a closure device having a wall thickness of between about 10 mils and 20 mils, with a draw-down ratio of between about 1.5:1 to 3:1 to preserve the integrity of its contours and function.

After extrusion, the integrated structure comprising the film, the tape or flange, and the closure assembly is forwarded to cooling means such as a chill roll 17 supported by a shaft 21 as shown in FIG. 1 for further cooling and then to further processing means such as a bag making machine or it may be rolled up as stock for future use. It is well known in the art that heavier extruded sections may require auxiliary cooling such as air blasts or liquids. These have been omitted from the description for the sake of clarity.

In FIG. 1A, an alternative method of practicing the instant invention is shown wherein the closure device is extruded onto the closure tape or flange at a point to that where the closure tape or flange meets with the extruded film, that is, at a point prior to where the closure tape or flange contacts the casting roll.

As earlier indicated, FIG. 2 is a plan view showing the main apparatus means of the instant invention wherein film slot die 11 is shown positioned above and parallel with casting roll 12. Positioned in sequence to slot die 11 is a pair of tape or flange dies 14 and 14', and in further sequence thereto is a pair of closure device dies 16 and 16' for the extrusion of closure elements having a male profile and a female profile, respectively. Also shown in FIG. 2 is a cooling means such as chill roll 17 provided with coolent line 19. Likewise casting roll 12 may be cooled as indicated at coolant line 18.

To achieve good bonding between the film-tape-closure assembly, the freshly extruded elements should contact each other at a temperature of at least about 200° F. The well-laminated assembly is depicted in FIG. 3 and it is shown therein that film 10 has closure tape or flange 13 bonded thereto at each of the end positions of film 10. Bonded to one of the closure tapes or flange 13 is a female closure element 15 and to the other closure tape a male closure element 15'. By referring to FIGS. 1, 1A and 2, those skilled in the art will recognize that closure tape or flange die 14 and closure device die 16 may be individually adjustable in two or more directions, and likewise in view of FIG. 2 and FIG. 3, that any number of closure tapes and closure devices may be extruded with film 10 by means of additional die stations.

In accordance with this invention, it is now possible to produce a film-tape-closure device structure by adding the components to each other after most of the elongation of each component has been accomplished. For example, the closure tape or flange may be added to the film after between about 75 to 100% of its elongation has been accomplished. In addition, the closure devices may preferably be added directly to the closure tape or flange at or near the casting roll. Although not described herein, standard components such as extruders, pipe lines, die heaters, lay-on air knives and edge trimmers are apparatus which are well known to one skilled in this art and, obviously, such devices may be employed in the practice of this invention, and the same applies to auxiliary cooling means external to the rolls for the heavier sections.

Further, pursuant to this invention, it will be appreciated that the material employed in the preparation of each of the elements herein may be the same or may be different for some or all of the elements. For example, the assembly may comprise a low density polyethylene film with a medium density polyethylene closure tape or flange and high density polyethylene closure devices, or any suitable combination of materials. Likewise, one or more of the components of the assembly herein may be prepared from polypropylene, polyamide, or other thermoplastic material, or any combination thereof. The components of this integrated assembly may have different colors or slip factors such as by using conventional additives in the materials employed. Further, where the material and draw properties vary, it may be desirable to provide various machine direction spacings by adjusting the dies to different film-tape-closure element juncture points. Likewise, where desirable, a transverse direction adjustment may also be made. Thus, as indicated, each closure tape or flange, each closure element, and the thermoplastic film may be produced from totally different polymers providing unique container constructions such as a pliable closure on a strong, stiff container body, or different colors may be imparted to the container body and the various parts of the closure tape or flange and closure device.

It is to be noted that certain advantages over the prior art accrue from the practice of this invention. One of these advantages is that by separating the three main container elements it is now possible to optimize the extrusion conditions for each of the elements. Equally important, the separation of these elements permits their placement in the machine direction to achieve improved cooling and controlled distortion. Also, separation of the elements now allows for lateral adjustment and choice of different materials for each element.

Having described the invention, it is contemplated that modifications thereof may be made and that some features may be employed without others, all within the spirit and scope of the invention. However, it is not desired to be limited to the illustrative embodiments for obvious modifications will occur to a person skilled in the art.

I claim:

1. A method of producing an integrated interlocking closure product comprising extruding a sheet of film onto a rotating casting roll at a rate to provide a high draw-down ratio, extruding a closure tape at a medium draw-down ratio to join said film, extruding a closure device at a small draw-down ratio to join said closure tape, and cooling said film, closure tape, and closure device on said casting roll.

2. A method of producing an integrated film, closure tape, and closure device structure comprising extruding from a first die a sheet of film at a high draw-down ratio onto a rotating casting roll; extruding from a second die a closure tape at a medium draw-down ratio to join said film on said casting roll; extruding from a third die a closure device at a small draw-down ratio to join said closure tape; and extracting the integrated structure after cooling.

3. A method in accordance with claim 2 wherein said film is extruded onto said said casting roll at a draw-down ratio of between about 10:1 to about 80:1 to provide a film having a thickness of between about 0.5 mil and about 3 mils.

4. A method in accordance with claim 2 wherein said closure tape is extruded at a rate to provide a draw-down ratio of between about 4:1 to about 10:1 to produce a closure tape having a thickness of between about 2 mils and about 5 mils.

5. A method in accordance with claim 2 wherein said closure device is extruded at a rate to provide a draw-down ratio of between about 1.5:1 to about 3:1 to produce a closure device having a wall thickness of between about 10 mils and 20 mils.

6. A method in accordance with claim 2 wherein said integrated structure is contacted at an extrusion temperature of at least about 200° F.

7. A method in accordance with claim 2 wherein said closure device has a male profile.

8. A method in accordance with claim 2 wherein said closure device has a female profile.

9. Apparatus for producing an integrated film, closure tape, and closure device structure comprising means for extruding a sheet of film onto a rotating casting roll; means for extruding a closure tape to join said film on said casting roll; means for extruding a closure device to join said tape; and means for extracting the integrated structure after cooling.

10. Apparatus in accordance with claim 9 wherein said means for extruding said sheet of film comprises a slot die.

11. Apparatus in accordance with claim 10 wherein said slot die has an elongated opening parallel to the axis of said casting roll.

12. Apparatus in accordance with claim 11 wherein the opening of said slot die is between about 30 mils and about 40 mils.

13. Apparatus in accordance with claim 9 including additional cooling means.

14. Apparatus in accordance with claim 9 including a chill roll.

15. Apparatus in accordance with claim 9 wherein said means for extruding a closure device includes closure dies for the extrusion of closure devices having a male profile portion and a female profile portion respectively.

* * * * *